June 17, 1924.
J. J. FINNEY
1,498,084
APPARATUS FOR MIXING OR BEATING PLASTIC MATERIALS
Filed Nov. 2, 1920 — 2 Sheets-Sheet 1
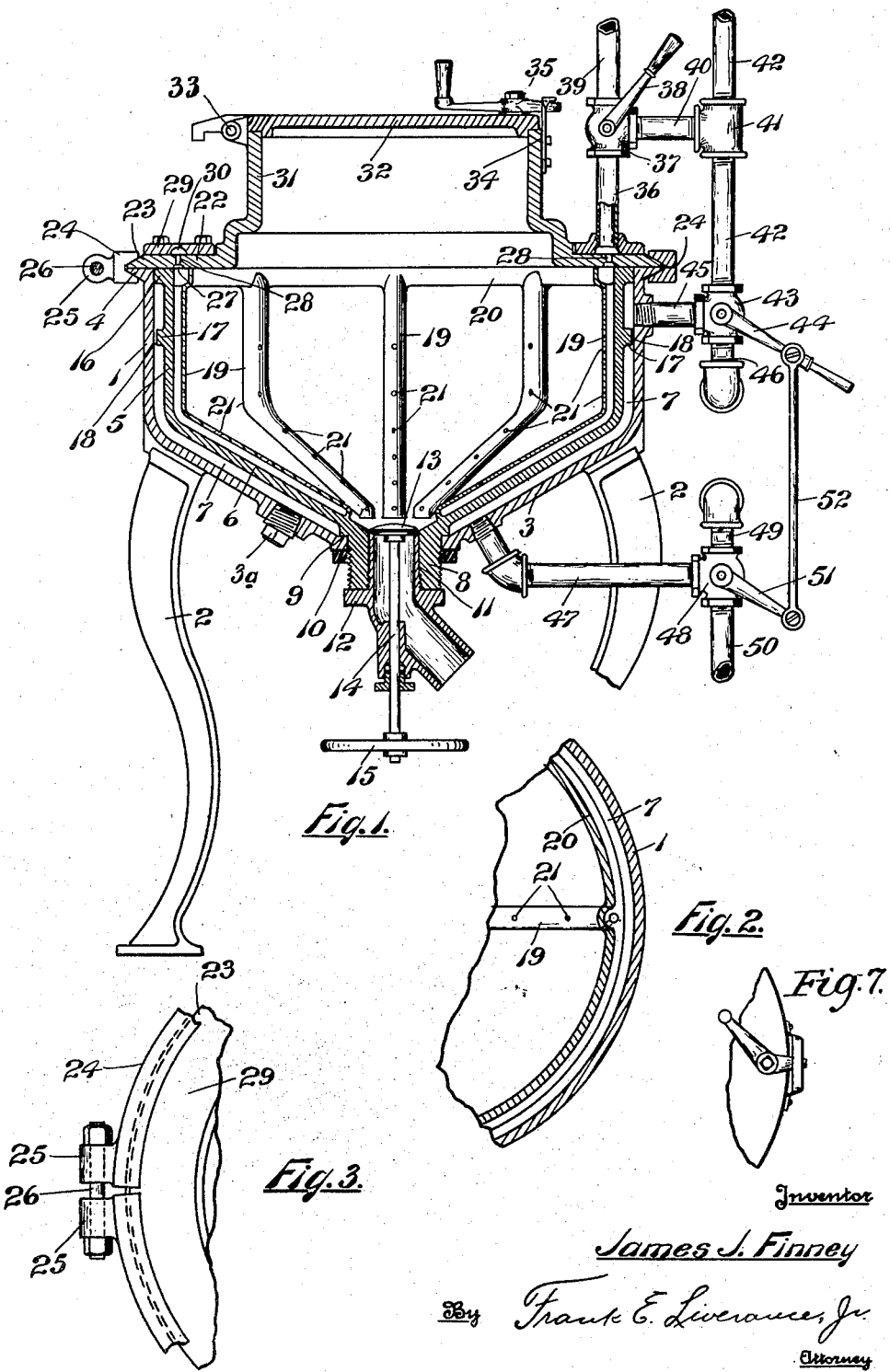
Inventor
James J. Finney
By Frank E. Liverance, Jr.
Attorney June 17, 1924. 1,498,084
J. J. FINNEY
APPARATUS FOR MIXING OR BEATING PLASTIC MATERIALS
Filed Nov. 2, 1920 2 Sheets-Sheet 2
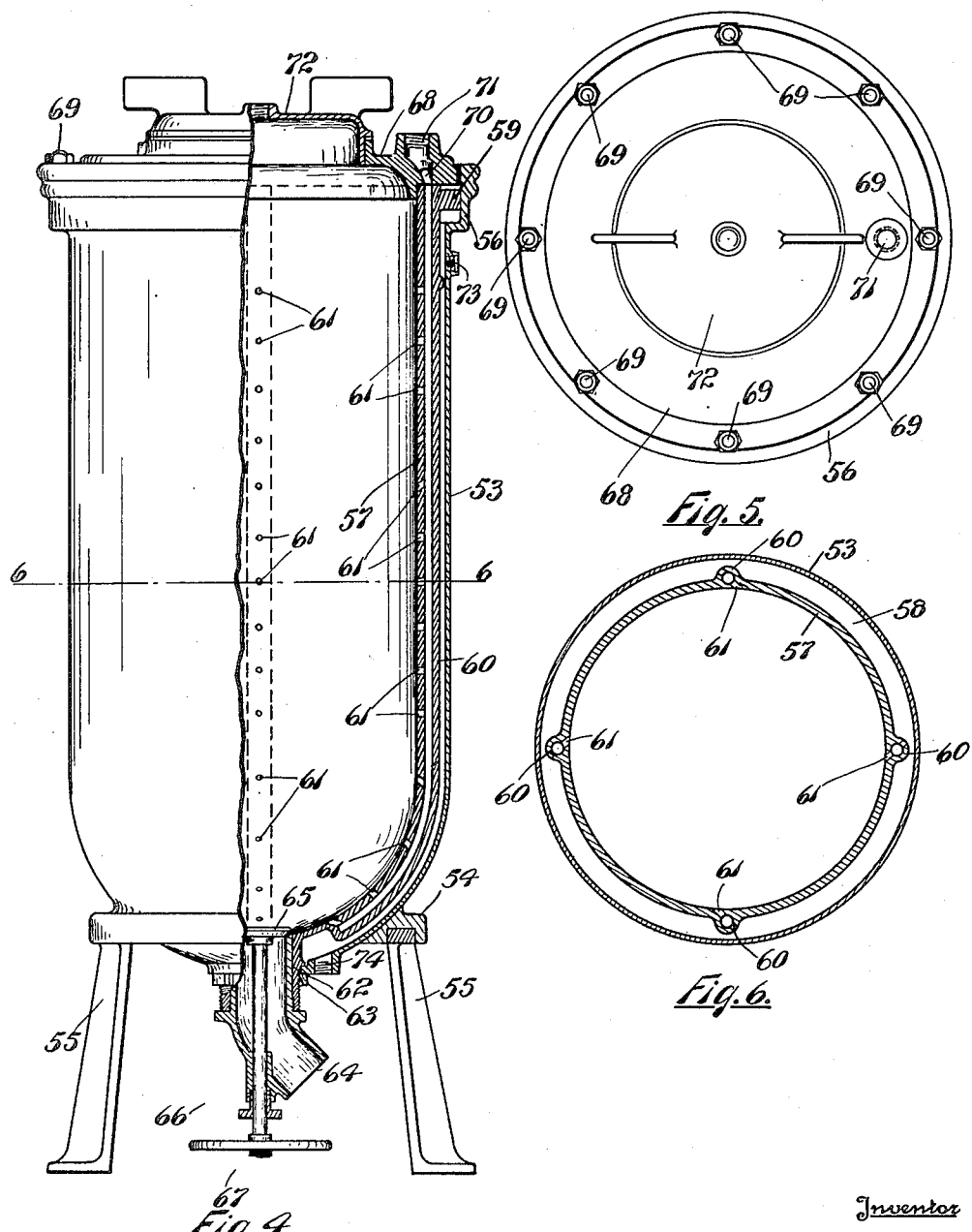

Patented June 17, 1924.

1,498,084

UNITED STATES PATENT OFFICE.

JAMES J. FINNEY, OF MUSKEGON, MICHIGAN, ASSIGNOR TO ALBERT G. DICKINSON, OF GRAND RAPIDS, MICHIGAN.

APPARATUS FOR MIXING OR BEATING PLASTIC MATERIALS.

Application filed November 2, 1920. Serial No. 421,299.

*To all whom it may concern:*

Be it known that I, JAMES J. FINNEY, a citizen of the United States of America, residing at Muskegon, in the county of Muskegon and State of Michigan, have invented certain new and useful Improvements in Apparatus for Mixing or Beating Plastic Materials; and I do hereby declare the following to be a full, clear, and exact description of the invention, such as will enable others skilled in the art to which it appertains to make and use the same.

In the preparation and manufacture of many kinds of candy it is common practice to cook the ingredients entering into the composition of the candy, using heat for the purpose, and as a necessary consequence of the heat applied, the ingredients must be stirred or mixed continuously to obtain an even cooking and to prevent burning. The mixing is usually done by a mechanical mixer located in the cooking receptacle and which is driven from suitable sources of power by interposed mechanism. In addition, with certain kinds of candy constituents, the cooked mass must be removed from the cooking receptacle and thereafter beaten for a considerable period to reduce the same to cream or "fondant" as it is known. This is costly, the mechanism is hard to keep in sanitary condition, and the complications in the mechanism require maintenance and repair frequently.

With the process and apparatus of my invention, primarily intended for use in candy manufacture, but useful in many other relations, all of the mechanism of moving parts for mixing or stirring the cooking mass is done away with and the mixing accomplished by the force of steam let into the mass cooking under pressure and forced through the mass from the sides and underneath the same. Also, the beating of the cooked mass is done in the same receptacle in which it is cooked without removal therefrom, the pneumatic force of compressed air being utilized to attain this end. The cooking receptacle is also very easily and quickly cleaned and kept in sanitary condition, all being accomplished with a relatively simple and easily manufactured apparatus as will appear from the following description, taken in connection with the accompanying drawings, in which, Fig. 1 is a vertical section taken through one form of apparatus used.

Fig. 2 is a fragmentary horizontal section taken through the cooking receptacle.

Fig. 3 is a fragmentary plan view of the receptacle and illustrating the connection of the ends of the top clamping ring.

Fig. 4 is a partial front elevation and vertical section illustrating a modified form of cooking receptacle.

Fig. 5 is a plan thereof.

Fig. 6 is a horizontal section on the plane of line 6—6, of Fig. 4.

Fig. 7 is a view enlarged showing the cover fastening construction used.

Like reference characters refer to like parts in the several figures of the drawings.

In the construction shown in Figs. 1 to 3 inclusive, an outer shell 1 is used and supported by legs 2. The shell tapers downwardly and inwardly as indicated at 3, an opening being left at the lower central portion of the shell. At its upper edges the shell is formed with an annular flange 4 having an inclined under side.

A second shell 5 is located within the first shell and has sides paralleling but spaced from the sides of the outer shell, the inclined under sides 6 of the inner shell paralleling the similar inclined under portion 3 of the outer side. The space 7 between the shells is substantially uniform in width. An exteriorly threaded neck 8 on the inner shell passes through the lower opening in the outer shell, a shoulder 9 resting on the outer shell and a securing nut 10 being threaded on neck 8 to secure the two shells together. An outlet pipe 11 is secured in neck 8, having a flange 12 which bears against the lower end of the neck, and the upper end of the outlet is normally closed by a valve 13 from which a rod 14 depends, passing through a side of the outlet and having an operating wheel 15 at its lower end. The valve may be lifted to discharge the contents of the inner shell whenever desired.

At its upper edges, shell 5 is formed with a flange 16 extending entirely around it and closing the upper end of the space 7 as shown. A second flange 17 projects from the inner shell but terminates a slight distance short of the outer shell leaving a narrow space 18 between the flange and said shell 1. A plurality of raised ribs 19 are cast integral with the inner shell, having passages therethrough but closed at their lower ends and all connect at their upper ends with a circular rib 20 cast with the inner shell at its upper part and on its inner side. Rib 20 also has a continuous passage therethrough. All of the ribs 19 have holes 21 made in spaced apart relation in the length thereof.

The upper open side of the receptacle thus made is covered by a cover plate 22 which, at its edges is cut or cast with a downward and outward incline as indicated at 23. A split ring 24 with a V-shaped groove on its inner side is placed around flange 4 and cover 22, the groove receiving the flange and outer part 23 of the cover. At the division in the ring lugs 25 are cast through which a bolt 26 may be passed, the same being tightened to clamp the cover against the upper edges of the two shells making the receptacle.

Directly over the upper rib 20 a groove 27 is made in the under side of the cover 22 and extends entirely around the cover. A plurality of openings 28 are made vertically through the cover leading from said groove. A flat ring 29 is bolted on the upper side of the cover and in its under side has a continuous groove 30 cut which lies over the upper ends of all of the openings 28.

The cover 22 is formed with an enlarged vertical entrance neck 31, the upper end on which may be closed by a cover plate 32 hingedly connected at one side, as at 33 and adapted to be held in closed position by a fastening means comprising links 34 and a cam lever 35, operation of which will bind the plate closely against the upper edges of the walls of the neck 31 as shown.

A pipe 36 leads through ring 29 to communicate with groove 30. A valve casing 37 connects with the opposite end of pipe 36 in which a two-way valve is mounted and operated by lever 38. Two pipes 39 and 40 lead into the casing 37, the latter joining with a T-coupling 41 into which sections 42 of pipe are threaded at opposite sides. The lower section 42 connects with a valve casing 43 housing a three-way valve operable through a handle 44. A pipe 45 leads from casing 43 to and through the outer shell 1 at a point above the flange 17. Another pipe connection 46 connects with the casing at its lower side.

Adjacent the lower part of the outer shell an exhaust pipe 47 is secured and leads to a second three-way valve casing 48 to which two branches 49 and 50 are secured as shown. A lever 51 operates the valve in the casing and the same is worked in unison with handle 44, a link rod 52 connecting the same.

In operation, the ingredients for candy are placed in the inner shell 5, a relatively small amount of water only being used. The pipe sections 42 carry steam and with valves in casings 37 and 43 turned properly, the steam passes into the space 7, furnishing heat for cooking, exhausting through pipe 47 and back to the boiler through connection 49, valve in casing 48 turning automatically to direct the exhaust properly. Steam also is carried through pipe 36 to groove 30, through openings 28 into the passage through rib 20 and downwardly through the ribs 19 passing out through the openings 21 and forcing itself upwardly through the cooking mass. The effect of this steam at high temperature and under high pressure is to stir and mix the mass and also aid in cooking the same. Any gas under high pressure forced through a plastic mass takes an irregular course, and with the openings 21 at different points, with a large number thereof and with the same positioned at different angles, the cooking mass is constantly permeated by jets of the gaseous steam and thus continually worked and mixed, while at the same time, the requisite additional moisture for the mass is supplied by condensation from the steam at the beginning. The passage at 18 is small and the entire area of the passage around the cooking receptacle is substantially the same as the area of the inlet passage in pipe 45 so that an even distribution of the steam entirely around the inner shell is attained.

After the mass is cooked, the steam may be turned off by moving the handle 44 to intermediate neutral position and air under pressure may be carried from the air pipe 39 through pipe 36, the valve in casing 37 being turned to shut off steam and pass air. The air then forces itself through the mass from openings 21 and forces itself through the same and accomplishes the operation of beating, the air, like the steam stirring, agitating and beating the cooked mass to a cream in a relatively short time. Compressed air coming to the cooked mass at the sides and under the same and directed at all angles therethrough performs the beating function effectively and in much shorter time than mechanical beating. The one construction, accordingly, is capable of the dual function of cooking and beating and this without mechanical agitation.

The construction is easily cleaned, there being no parts hard of access and water for cleaning may be placed within the inner shell and steam entered thereinto for heating the same as is apparent. In addition, the interior space 7 may be very easily cleaned, a proper cleaning compound being introduced through the opening normally closed by the plug 3$^a$ and water carried through pipe 46 and out through pipe 50 which runs to the sewer, the valves operated by levers 44 and 51 being turned to upper position to make free passage for the water.

In Figs. 4 to 6 inclusive a modified construction is shown. The outer shell 53 is elongated and has a flange 54 at its lower end for connection of the supporting legs 55. At its upper end said shell is made with an enlargement 56. The inner shell 57 is spaced from the outer shell there being a space 58 between them. At its upper end the inner shell is formed with a flange 59 which is welded to the outer flange to make a permanent steam tight connection. A plurality of spaced apart ribs 60 with vertical passages therethrough are cast integral with and lie at the outer sides of the inner shell in the space 58, and a plurality of spaced apart openings 61 are made through the inner shell from the vertical passages. The inner shell has a depending neck 62 receiving a securing nut 63 to lock the shells together at their lower ends, and an outlet member 64 is threaded on to the lower end of the neck. A closing valve 65 closes the upper end of the neck, a rod 66 with an operating member 67 at its lower end passing downwardly through member 64 as shown. A cover 68 is secured by bolts 69 at the upper end of the receptacle thus made in which cover an annular groove 70 lying over the upper ends of the passages in ribs 60, and an entrance opening 71 for the insertion of a pipe similar to pipe 36 is made through the cover to communicate with groove 70. An opening is made in cover 68 which is closed by a removable cover 72. And an entrance opening 73 and outlet opening 74 are made through the outer shell for the connection of inlet and outlet pipes similar to pipes 45 and 47 as shown in the first construction. The operation of this construction is the same as that first described, it being understood that the various pipe and valve connections for controlling the entrance of steam or compressed air and the like are the same as that shown in Fig. 1.

The advantages of the construction and process described are obvious. Elimination of mechanical mixing, beating and mechanism for accomplishing the same, together with the possibility of cooking and beating in the same device without removal of the hot cooked mass, and the ease of keeping the construction clean and sanitary, all are evident.

I claim:

1. In combination, an inner shell formed with vertical gas carrying passages at its sides and bottom, a plurality of openings being made to connect said passages with the interior of the shell, a second shell located around the first shell and spaced therefrom, means closing said space between the shells at top and bottom, means for carrying a heated gas under pressure to the space between the shells, and means for carrying said heated gas to said vertical passages, substantially as described.

2. In combination, a receptacle for containing plastic material, said receptacle having a plurality of vertical ribs at its sides and bottom having vertical passages therethrough with a plurality of openings made to connect each passage with the interior of the receptacle, a cover for the receptacle having a plurality of openings therein in a circle over the upper ends of said passages, means having a continuous passage therethrough joining the upper ends of all the ribs, said passage communicating the said vertical passages and said openings in the cover joining with said continuous passage, a ring formed with a circular groove in its under side attached to the cover, said groove being located over the upper ends of all the openings in the cover, and a pipe connected with said ring and communicating with the groove therein, substantially as and for the purposes described.

3. A construction containing the elements defined in combination in claim 2, combined with a valve casing having a two-way valve therein attached to the opposite end of said pipe, and two pipes adapted to carry compressed air and steam under pressure, respectively leading into said valve casing, and means to turn the valve, substantially as described.

4. In combination a receptacle comprising inner and outer shells connected together in spaced apart relation, the space between the shells being closed at its upper and lower ends, said inner shell having a plurality of integral vertical ribs at its sides having vertical passages therethrough and with a plurality of spaced apart openings connecting the passage in each rib with the interior of the shell, a flange located between the shells with a narrow passage between the flange and one of the shells, a pipe entering the outer shell above the flange, an outlet pipe entering the outer shell below the flange, means for selectively entering either air or steam under pressure into the passages in said ribs, and means for selectively entering either steam or water into the space between the shells, substantially as described.

In testimony whereof I affix my signature.

JAMES J. FINNEY.